(12) United States Patent
Schneidmiller et al.

(10) Patent No.: US 8,813,419 B2
(45) Date of Patent: Aug. 26, 2014

(54) STINK BUG TRAP

(75) Inventors: Rodney G. Schneidmiller, Greenacres, WA (US); Qing-He Zhang, Spokane Valley, WA (US); Marc Chapin, Spokane, WA (US)

(73) Assignee: Sterling International Inc., Spokane, WA (US)

( * ) Notice: Subject to any disclaimer, the term of this patent is extended or adjusted under 35 U.S.C. 154(b) by 239 days.

(21) Appl. No.: 13/331,394

(22) Filed: Dec. 20, 2011

(65) Prior Publication Data

US 2012/0186137 A1 Jul. 26, 2012

Related U.S. Application Data

(60) Provisional application No. 61/435,647, filed on Jan. 24, 2011, provisional application No. 61/453,033, filed on Mar. 15, 2011.

(51) Int. Cl.
*A01M 1/10* (2006.01)
*A01M 1/04* (2006.01)

(52) U.S. Cl.
CPC ............... *A01M 1/106* (2013.01); *A01M 1/04* (2013.01); *A01M 1/103* (2013.01)
USPC .............................................. 43/121; 43/122

(58) Field of Classification Search
USPC .......................................... 43/121, 107, 122
See application file for complete search history.

(56) References Cited

U.S. PATENT DOCUMENTS

| 726,604 A | | 4/1903 | Williamson | |
|---|---|---|---|---|
| 1,134,318 A | * | 4/1915 | Deardoff | 43/121 |
| 1,772,989 A | * | 8/1930 | Emley | 43/107 |
| 3,581,429 A | * | 6/1971 | Hickman et al. | 43/107 |
| 4,244,135 A | * | 1/1981 | Harwoods | 43/122 |
| 4,706,410 A | | 11/1987 | Briese | |
| 5,134,802 A | * | 8/1992 | Cogan et al. | 43/107 |
| 5,392,560 A | | 2/1995 | Donahue et al. | |
| 6,722,080 B2 | | 4/2004 | Carter | |
| 6,910,298 B2 | | 6/2005 | Schneidmiller | |
| 7,150,125 B1 | | 12/2006 | Mizell, III | |
| D544,065 S | | 6/2007 | MacQueen | |
| D561,297 S | | 2/2008 | Schneidmiller | |
| 7,412,797 B1 | | 8/2008 | Hiscox | |

(Continued)

FOREIGN PATENT DOCUMENTS

JP 2008-161090 A 7/2008

OTHER PUBLICATIONS

International Search Report and Written Opinion mailed Sep. 25, 2012, issued in corresponding International Application No. PCT/US2011/066266, filed Dec. 20, 2011, 7 pages.

*Primary Examiner* — Darren W Ark
*Assistant Examiner* — Kathleen Alker
(74) *Attorney, Agent, or Firm* — Christensen O'Connor Johnson Kindness PLLC (57) ABSTRACT

A trap (100, 100') for pestiferous insects, such as stink bugs and the like, that takes advantages of innate behavioral characteristics of the target insect. The trap includes a lid (140) defining an entry aperture (170), an entry cone (110, 110') on one side of the entry aperture, a vane assembly (160) on an opposite side of the vane assembly, and an entrapment chamber (102) that releasably engages the lid. A collar (120, 120') on the entry cone facilitates insects dropping into the trap and prevents insects from exiting the trap after dropping in.

15 Claims, 8 Drawing Sheets

(56) References Cited

U.S. PATENT DOCUMENTS

| | | |
|---|---|---|
| D590,041 S | 4/2009 | Schneidmiller et al. |
| 7,886,481 B2 | 2/2011 | Schneidmiller et al. |
| D645,535 S | 9/2011 | Schneidmiller et al. |
| 8,051,600 B2 | 11/2011 | Schneidmiller |
| 8,056,282 B2 | 11/2011 | Schneidmiller |
| 2006/0016120 A1* | 1/2006 | Masters et al. .................. 43/114 |
| 2009/0282728 A1* | 11/2009 | McKnight et al. .............. 43/109 |

* cited by examiner

STINK BUG TRAP

CROSS-REFERENCES TO RELATED APPLICATIONS

This application claims the benefit of U.S. Provisional Application No. 61/435,647, filed Jan. 24, 2011, and also claims the benefit of U.S. Provisional Application No. 61/453,033, filed Mar. 15, 2011, both of which are hereby incorporated by reference in their entireties.

BACKGROUND

Pentatomoidea is a superfamily of insects that includes some of the stink bugs and shield bugs. The name stink bug derives from their tendency to eject an odiferous defensive substance when disturbed, typically as a form of anti-predator adaptation. The term "stink bug" is also applied to distantly related species such as *Boisea trivittata* (Say), the "boxelder bug," and insects such as beetles in the genus *Eleodes* such as the pinacate beetle (also known as the stink beetle). Many stink bugs and shield bugs are considered agricultural pest insects. They can generate large populations that damage crop production and are resistant to many pesticides. Moreover, they are immune to crops that have been genetically modified to be pest-resistant, such as Bt crops (i.e., crops having the protein known as the Bt toxin). Over the past 5-10 years, stink bugs and similar plant pests have become the most serious pest problems in many parts of the world, especially in regions with large areas of Bt crops.

For example, the brown marmorated stink bug ("BMSB"), *Halyomorpha halys* (Stal) native to Asia, is believed to have been accidentally introduced into the United States as early as 1996, likely as stowaways, possibly as eggs, on packing crates or the like. The BMSB has been recorded in a total of 33 states and the District of Columbia, according to information provided by the U.S. Department of Agriculture and the National Agricultural Pest Information System (NAPIS) (http://pest.ceris.purdue.edu). The BMSB has emerged as a severe pest of fruit and other crops across the region. In addition, this invasive species is a serious nuisance for homeowners and businesses as it overwinters in residential houses, commercial buildings, and warehouses.

The brown marmorated stink bug can cause widespread damage to fruits, vegetables and field crops, including peaches, apples, green beans, soybeans, corns, cherries, raspberries, and pears. It is a sucking insect that uses its proboscis to pierce the host plant in order to feed. This feeding may cause necrotic areas on the outer surface of fruits, leaf stippling, cat-facing on tree fruits, seed loss, and transmission of plant pathogens. Frequently, the brown marmorated stink bug survives the winter as an adult by entering structures that shield them from the elements. During the overwintering period, stink bugs are generally less active and normally aggregate in dark spaces for hibernation; however, stink bugs may awaken and crawl/walk around in rooms or other indoor spaces when indoor temperatures are high, especially during late winter and early spring. Such indoor activity creates various inconvenient issues (such as unpleasant smells and other annoying activities) for residents.

In U.S. Pat. No. 7,150,125, Mizell discloses a trap designed for insects, such as stink bugs, similar to the so-called "Tedders trap" and including a bottom portion formed from two intersecting and tapered planer portions and a baglike top portion that fits over the lower portion. The Mizell trap, however, does not take advantage of certain behavioral characteristics of the stink bug, and therefore could be more effective. There remains a need for improved insect traps.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A trap for pestiferous insects, for example, stink bugs, is disclosed. The trap is effective, easily assembled, and reusable. In a current embodiment, the trap includes a lid that defines an aperture that provides a path for entry into the trap, and an entry cone disposed over the aperture. A small collar is slidably disposed over a distal portion of the entry cone, such that an inner edge abuts the entry cone and an outer edge is disposed away from the entry cone. A vane assembly extends from the opposite side of the entry aperture providing a bridge into the trap. The vane assembly includes a plurality of vanes that are configured to encourage the target insect to enter the trap. For example, the vanes may be curved, may include surface features such as angled ridges that broadly emulate a leaf structure, may include an outboard flange, and/or may include a plurality of apertures that permit air and light to pass through the vane. In a particular embodiment, the distal end of the plurality of leaves includes interconnecting members that releasably lock the vanes together. An entrapment chamber is disposed over the entry cone and engages the lid. In a preferred embodiment, the entrapment chamber is transparent.

In an embodiment the trap is directed to trapping stink bugs, such as the brown marmorated stink bug.

In an embodiment, the lid includes a support structure disposed transversely through the entry aperture, and the support structure includes a plurality of retaining apertures that engage and retain the vane assembly. The support structure may also include panels that extend into the entry cone to provide a bridge or path for target insects to crawl onto the entry cone. The entry cone may include perforated panel portions that provide perch for the target insects and permit light and air to pass through.

The collar in a particular embodiment includes a coating on its upper surface, for example, a coating that includes polytetrafluoroethylene powder, to make the collar more slippery to the target insect. The collar and/or the entry cone may also include a structure for hanging a package of attractant in the trap.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
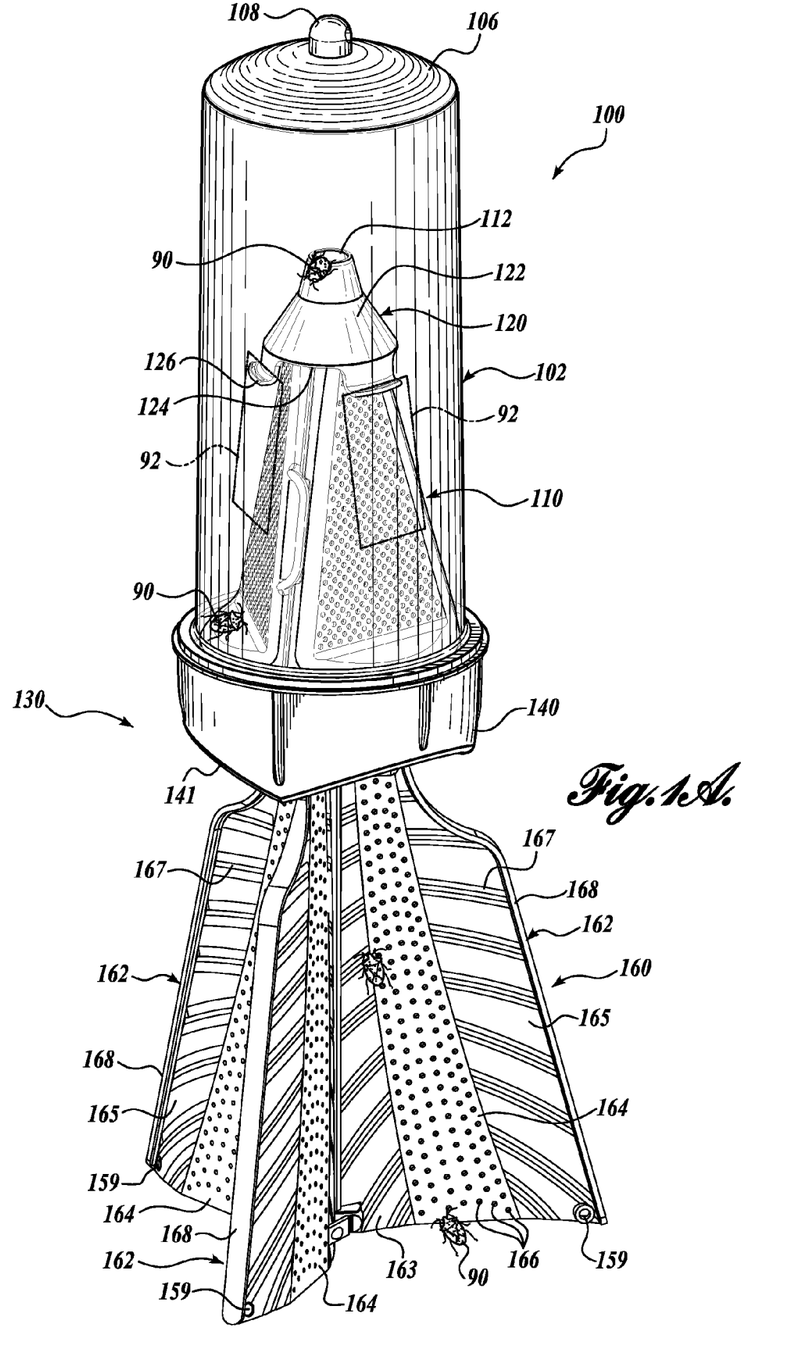
FIG. 1A is a perspective view of an insect trap in accordance with the present invention, shown with a frustoconical collar incorporating attractant hooks.
Figure 2:
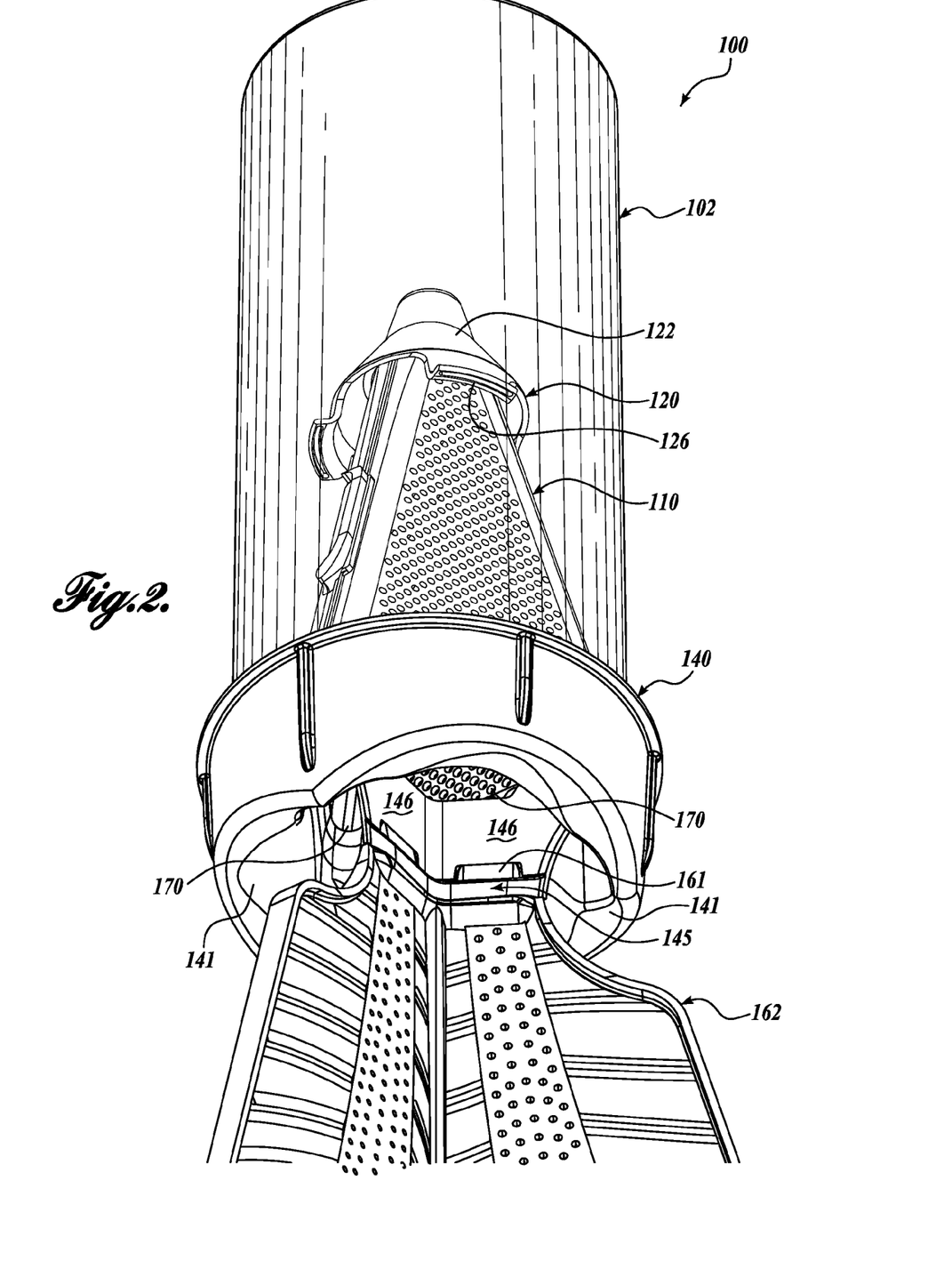
FIG. 2 is a fragmentary perspective view of the insect trap shown in FIG. 1A, showing trap entryways.
Figure 3:
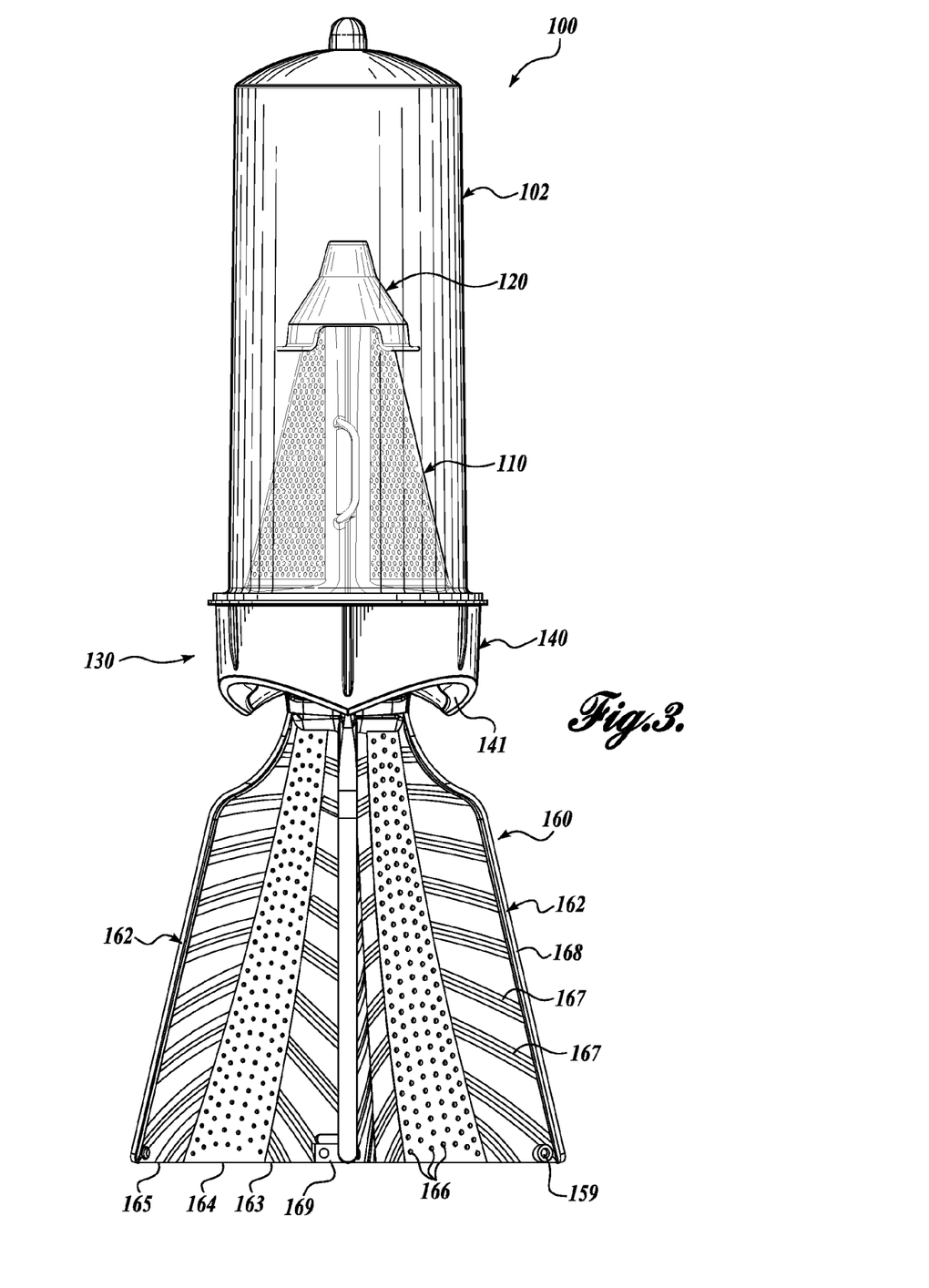
FIG. 3 is a front view of the insect trap shown in FIG. 1A.
Figure 4:
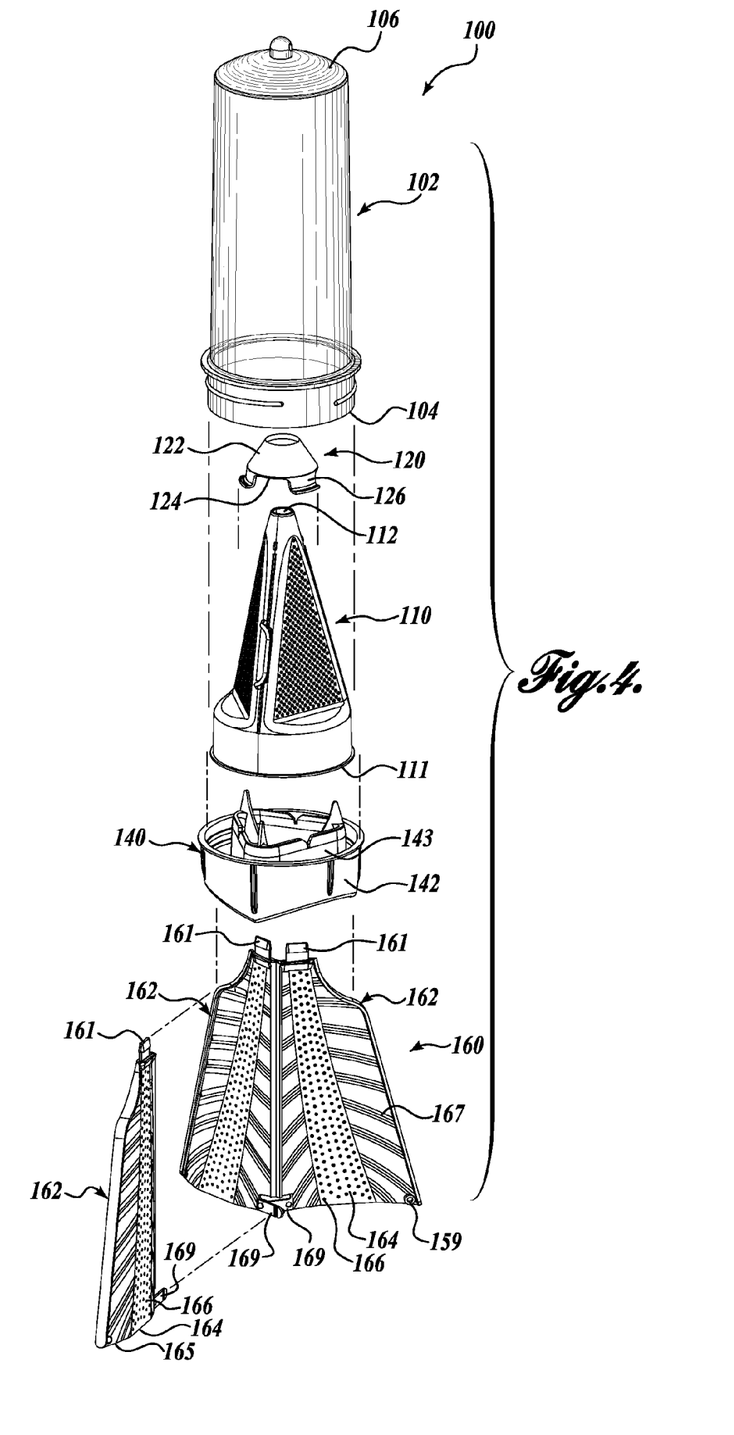
FIG. 4 is a partially exploded view of the insect trap shown in FIG. 1A.

Preferred embodiments of the present invention will now be described that were developed specifically for trapping stink bugs, with reference to the figures wherein like numbers indicate like parts. As will be apparent from the description below, the disclosed trap is designed to take advantage of certain innate behavioral tendencies and instinctive characteristics of the target insect species. It is contemplated that the teachings of the present invention may be applied to trapping other true bugs (Hemiptera), including, for example, shield bugs and plant bugs. FIG. 1A is a perspective view of an insect trap 100 in accordance with the present invention that is particularly suited for capturing insects 90 such as stink bugs, for example, brown marmorated stink bugs and the like. A second fragmentary perspective view of the insect trap 100 is shown in FIG. 2. A front view of the insect trap 100 is shown in FIG. 3, and a partially exploded, perspective view is shown in FIG. 4.

The trap 100 comprises an entrapment chamber 102, which in this embodiment is a generally cylindrical member that is open at a bottom end 104 and closed at a top end 106. However, it will be readily apparent that the entrapment chamber may be alternatively shaped without departing from the present invention. The top end 106 may optionally include a nib 108 to facilitate securing the trap 100 at a desired location. The entrapment chamber 102 may be formed from a transparent or translucent material to permit light to enter the entrapment chamber 102. It is also contemplated that the color of the entrapment chamber 102 will preferably be selected to attract the target species. For example, the brown marmorated stink bug may be particularly attracted to green, blue, or other dark color(s).

An inner member herein referred to as an entry cone 110 is disposed in the entrapment chamber 102. It will be appreciated from the figures that the term "cone" should be interpreted broadly, and that the currently preferred entry cone 110 is neither a right circular cone nor an axisymmetric cone. The entry cone 110 also does not taper to a point. In the present embodiment the entry cone 110 tapers from a large opening 111 at a bottom or proximal end disposed near one end 104 of the entrapment chamber, to a small opening 112 at a distal end disposed inside the entrapment chamber 102. The entry cone 110 is described in more detail below. A collar 120 is positioned over a top end of the entry cone 110. The collar 120 includes a frustoconical upper portion 122 with a top edge that engages the entry cone 110 and a lower edge 124 that extends away from the entry cone 110. Optionally, one or more hook members 126 may extend down from the lower edge 124 of the collar 120.

Preferably the surface of the frustoconical upper portion 122 is provided with a slippery or non-stick upper surface to facilitate the target insects 90 falling from the collar 120 towards the bottom of the entrapment chamber 102, and to prevent insects 90 from crawling back out of the trap 100. For example, the upper portion 122 may include a layer of polytetrafluoroethylene powder (e.g., with a particle size of 0.1 to 3.0 microns) such as that marketed under the trade name Teflon® or Fluon®. In an exemplary treatment, the polytetrafluoroethylene powder layer is achieved by applying (e.g., dipping or spraying) to the upper portion 122 an aqueous solution of polytetrafluoroethylene powder and a surfactant, for example, an ethylene oxide/propylene oxide copolymer such as that marketed under the trade name Tergitol®. Of course, it will be readily apparent to persons of skill in the art that other known materials and/or application methods may alternatively be utilized to achieve a similar result.

The upper portion 122 may also include a layer of porous film, for example, with a pore size of 0.1 to 3.0 microns and porosity of 20-50%; such film can be made from aluminum oxide or any other organic or inorganic material that could create the pore sizes and porosity in the above-referenced ranges. Furthermore, the entire collar 120 may be made from a porous material (e.g., with "slippery" pore sizes and porosities) that is strong enough to withstand the insect activities.

A base portion 130 of the trap 100 includes a lid 140, which may be substantially annular. The lid 140 releasably engages the bottom end 104 of the entrapment chamber 102. A vane assembly 160, which in this embodiment comprises a plurality of panels or vanes 162 (three shown), extends downwardly from the lid 140.

As illustrated in phantom in FIG. 1A, one or more sources of attractant 92 may be enclosed within the entrapment chamber 102. In an exemplary embodiment, the attractant 92 is containerized in a dispenser that provides for a gradual release of the attractant 92. In the trap 100 shown in FIG. 1A, each attractant package 92 is retained on one of the hook members 126 of the collar 120. Alternatively it is contemplated that the attractant 92 may simply be placed between the entrapment chamber 102 and the entry cone 110.

The attractant may be a pheromone (or kairomone) derived from the target insect or from a related insect or a host plant, for example. The brown marmorated stink bug has been found to be attracted in the field to the aggregation pheromone of the brown-winged green bug, *Plautia stali*, methyl (2E,4E, 6Z)-decatrienoate (2E,4E,6Z-10:COOMe). One theory for this cross-attraction is that the brown marmorated stink bug exploits the pheromone of the brown-winged green bug to find food and/or hibernation sites. In the preferred embodiment, the attractant 92 is disposed between the entrapment chamber 102 and the entry cone 110. This configuration provides a higher vapor concentration of attractant in the entrapment region of the trap outside the entry cone 110 to further encourage the insects 90 to continue through the small aperture 112 into the region outside of the entry cone 110.

Figure 6:
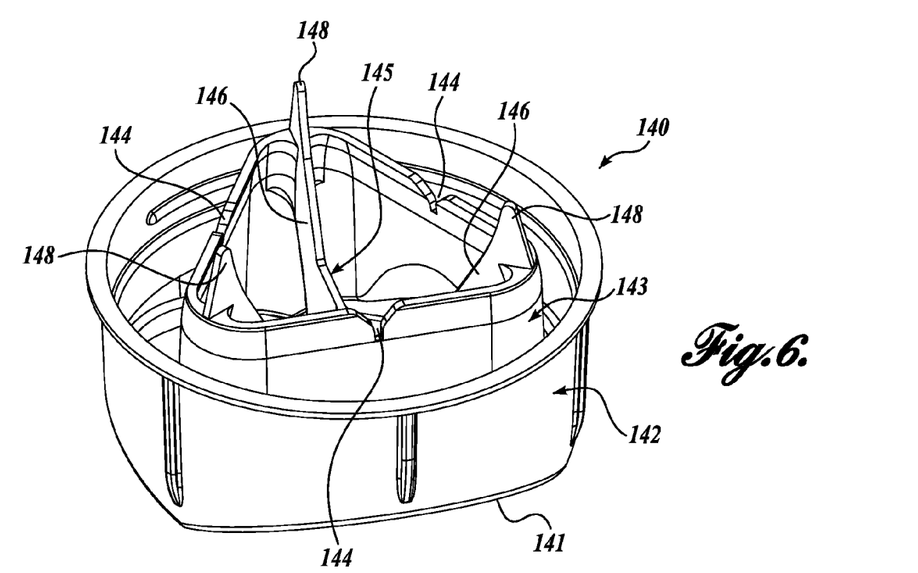
FIG. 6 is a perspective view of the lid for the exemplary insect traps shown in FIGS. 1A and 1B, viewed from above.
Figure 7:
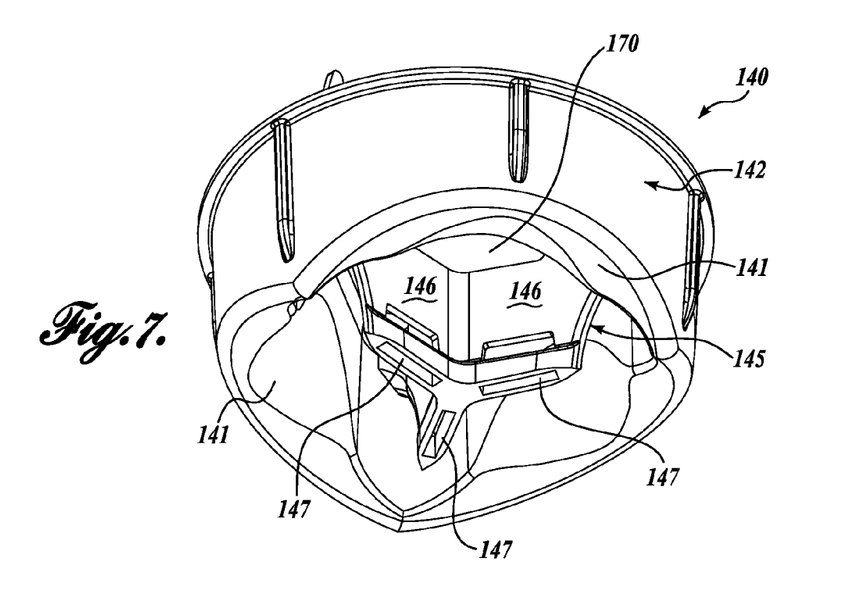
FIG. 7 is a perspective view of the lid for the exemplary insect traps shown in FIGS. 1A and 1B, viewed from below.

FIGS. 6 and 7 show perspective views of the lid 140 in isolation. The lid 140 is advantageously formed in an organic shape with contoured lower surfaces 141. The organic shape improves the efficacy of the trap 100 by avoiding right angles and boxlike appearances that may deter insects 90 from entering the trap 100. An outer wall 142 of the lid 140 includes interior threads configured to engage corresponding threads on the entrapment chamber 102. The outer wall 142 may also include knurls, grip tape, or the like to facilitate attaching and removing the lid 140.

The lid 140 in this embodiment further includes an inner wall 143 that is spaced inwardly from the outer wall 142. The inner wall 143 is generally triangular with rounded corners to correspond with the three vanes 162. Of course, it is contemplated that the inner wall may be shaped differently, for example, to accommodate a different number of vanes. A central support structure 145 is fixed to, or co-formed with, the lid 140, and comprises three panels 146 that extend radially from a shared edge generally along the centerline of the triangular inner wall 143. It will now be appreciated that the support structure 145 and inner wall 143 thereby define three apertures or entryways 170 (one visible, see also FIG. 2) through the lid 140 and into the trap 100. Each of the three panels 146 has a lower edge that defines a retaining aperture 147 or other mechanism for attachment of the vanes 162. As seen most clearly in FIG. 6, the panels 146 in the present embodiment include an extending portion 148 that extends above the upper edge of the inner wall 143. The extending portion 148 is positioned to have an edge that is near, or abuts, the entry cone 110, providing a bridge from the entryway 170 to the entry cone 110. As also seen in FIG. 6, the upper edge of the inner wall 143 further includes three slots 144 that are positioned to receive corresponding tabs 116 (FIG. 5A) in the entry cone 110, as discussed below.

Figure 5A:
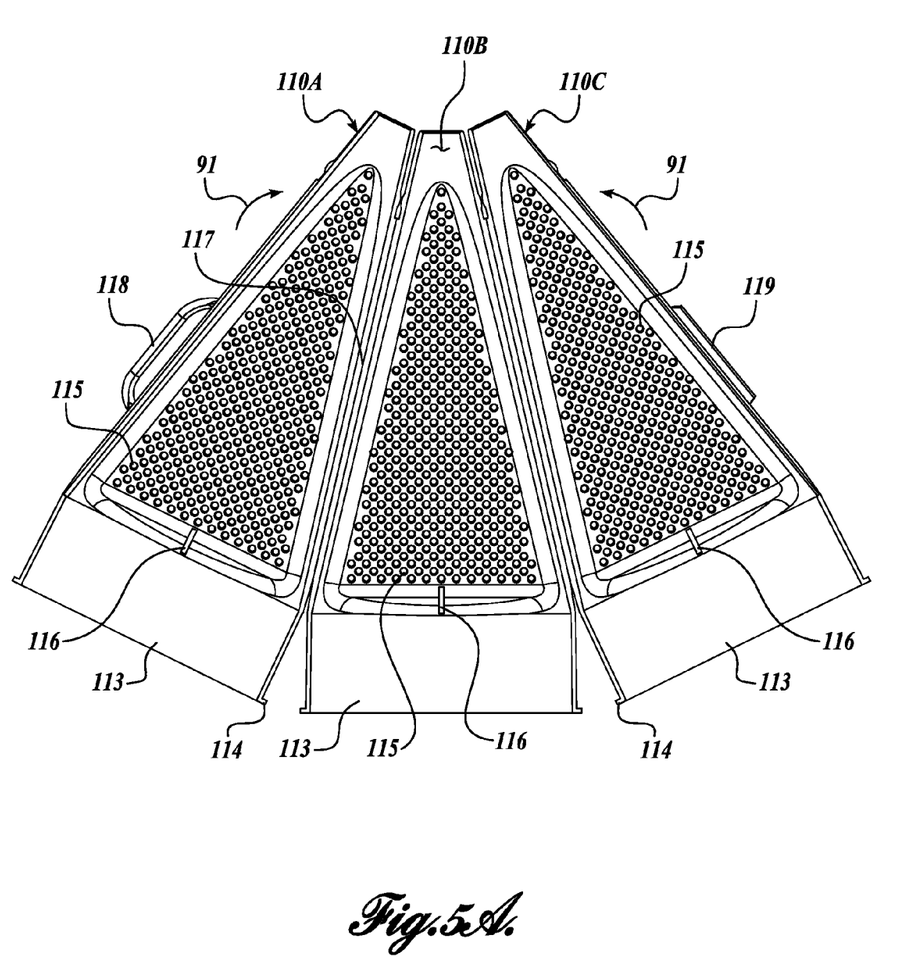
FIG. 5A is an unassembled view of an entry cone structure for the exemplary insect trap shown in FIG. 1A.

An unassembled view of the current entry cone 110 is shown in FIG. 5A. Although many of the details of the construction are not critical to the present invention, the currently preferred embodiment is herein described for completeness. An alternative construction of the entry cone is disclosed in the priority provisional application cited and incorporated by reference above. The entry cone 110 in this embodiment is made of a pliable plastic with three segments 110A, 110B, and 110C formed as a single unit, with hinges 117 integrally formed between neighboring sections.

End segment 110A includes a connector ring 118 on one edge, and the other end segment 110C includes a locking member 119 that is sized to snap into the connector ring 118 to form the entry cone 110. The segments 110A, 110B, 110C each include a lower portion 113 that is shaped such that when assembled the lower portions 113 cooperatively define a cylindrical portion that slides snugly into the entrapment chamber 102. A flange 114 abuts the bottom edge of the entrapment chamber 102. Generally triangular panel portions 115 extend upwardly from the lower portions 113. The panel portions 115 are perforated to encourage insects 90 to climb by permitting for the transmission of light and air therethrough. Each of the segments 110A, 110B, 110C includes a tab 116 that is positioned to engage the lid slots 144 described above.

To assemble the entry cone 110, the end segments 110A and 110C are pivoted about the hinges 117 as indicated by arrows 91, and the locking member 119 is inserted to engage the connector ring 118.

The panels 146 of the central support structure 145 described above provide a path for insects to climb from the vanes 162 to the inside surface of the entry cone 110. It will be appreciated that when the trap 100 is in an upright position, the panel portions 115 of the entry cone 110 are disposed at a relatively small angle from vertical, for example, the panel portions 115 may be less than 30° from vertical. This relatively gentle angle facilitates and encourages the target insects 90 to continue to climb the near-vertical wall defined by the panel portions 115. Also, the panels 146 defining the central support structure 145 are essentially vertical with the extending portions 148 extending upwardly to approximately abut the panel portions 115 of the entry cone 110. The vertical and near-vertical orientation of the panels 146 and the panel portions 115 take advantage of the stink bug's behavioral tendencies to climb upward on a vertical or near-vertical surface.

Refer again to FIGS. 1A and 4. The vanes 162 are optionally designed with particular features that also take advantage of the stink bug's 90 behavioral tendencies. Stink bugs 90, for example, tend to alight on a surface, such as the ground, and climb. For example, they may approach and even strike the vane 162 causing them to land at the base of the vane 162. The vanes 162 are designed to encourage the insect 90 to climb the vane 162 and to enter the entrapment chamber 102.

In this exemplary embodiment, the vanes 162 are each curved in a horizontal cross section to provide a more natural and organic shape that will be more inviting to the insect 90. For example, the vanes 162 may each be curved about a generally vertical axis. As seen most clearly in FIGS. 1A and 1B, the vanes 162 may include a center portion 164 that is substantially planar, an inner portion 163 extending inwardly from the center portion 164, and an outer portion 165 extending outwardly from the center portion 163, wherein the inner and outer portions 163, 165 are curved or angled with respect to the center portion 164.

Figure 1B:
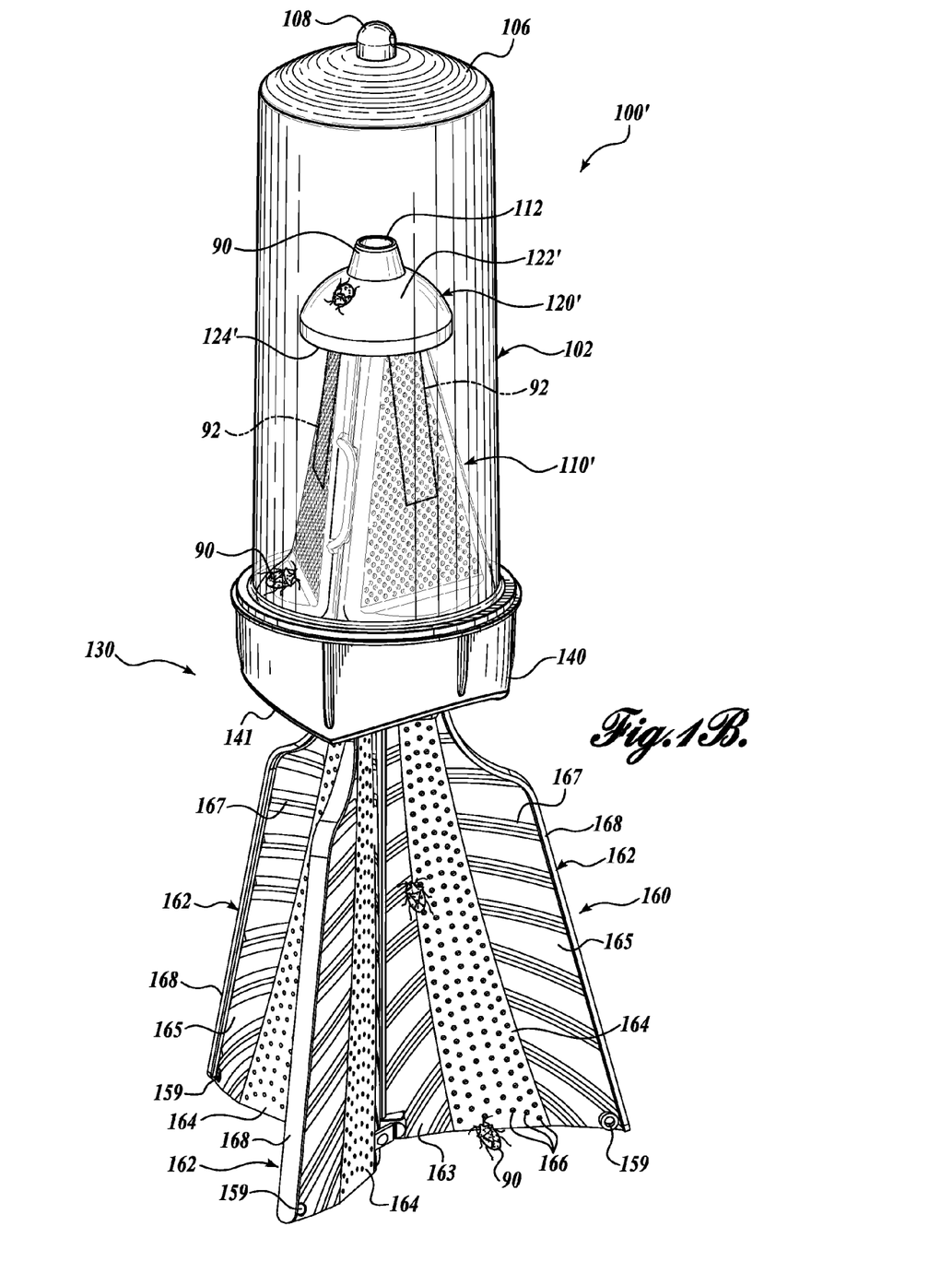
FIG. 1B is a perspective view of a second embodiment of an insect trap in accordance with the present invention, shown with a hemispherical collar.

The vanes 162 are further provided with surface features that encourage and facilitate climbing. For example, in the present embodiment the center portions 164 are provided with a plurality of apertures 166 that extend along the length of the vane 162. The apertures 166 facilitate climbing by providing a perch for the insects 90, and also permit air and light to penetrate, again providing a more organic-mimicking environment to encourage continued climbing. The inner portion 163 and outer portion 165 of each vane 162 further include a plurality of surface ridges 167 that extend generally from the center portion 164 to the inner and outer edges of the vane 162. The ridges 167 generally mimic a leaf vein structure and further facilitate climbing the vane 162, and gently encourage the insects 90 toward the center portion 164. The outer edge of each vane 162 is further provided with a flange 168, such that climbing insects 90 are directed upwardly.

As seen most clearly in FIGS. 2 and 4, the upper end of the vanes 162 includes a tab 161 that is sized and configured to lockingly engage the retaining apertures 147 (see FIG. 7) in the lid 140 to attach the vanes 162 to the lid 140. In addition, each vane 162 includes a lower attachment tab 169 with a natural hinge to permit articulation of the tab 169. The three lower attachment tabs 169 interconnect to connect the three vanes 162 at the bottom end. Optionally, the vanes 162 may further comprise means for fixing the trap 100 at a particular location. For example, apertures 159 in the lower outside corners of each vane 162 in the current embodiment may be provided with a string, cable, tie wrap, or the like (not shown) that can be secured to a fixed object, such as a portion of a tree, a pipe, etc.

FIG. 1B is a perspective view of another insect trap 100' in accordance with the present invention. This embodiment is similar in many aspects to the insect trap 100 described above, including the vane assembly 160, annular lid 140, and entrapment chamber 102. Descriptions of common features will not be repeated here, for brevity and clarity. In this embodiment, the entry cone 110' and the collar 120' are different from corresponding components of the trap 100 shown in FIG. 1A.

Figure 5B:
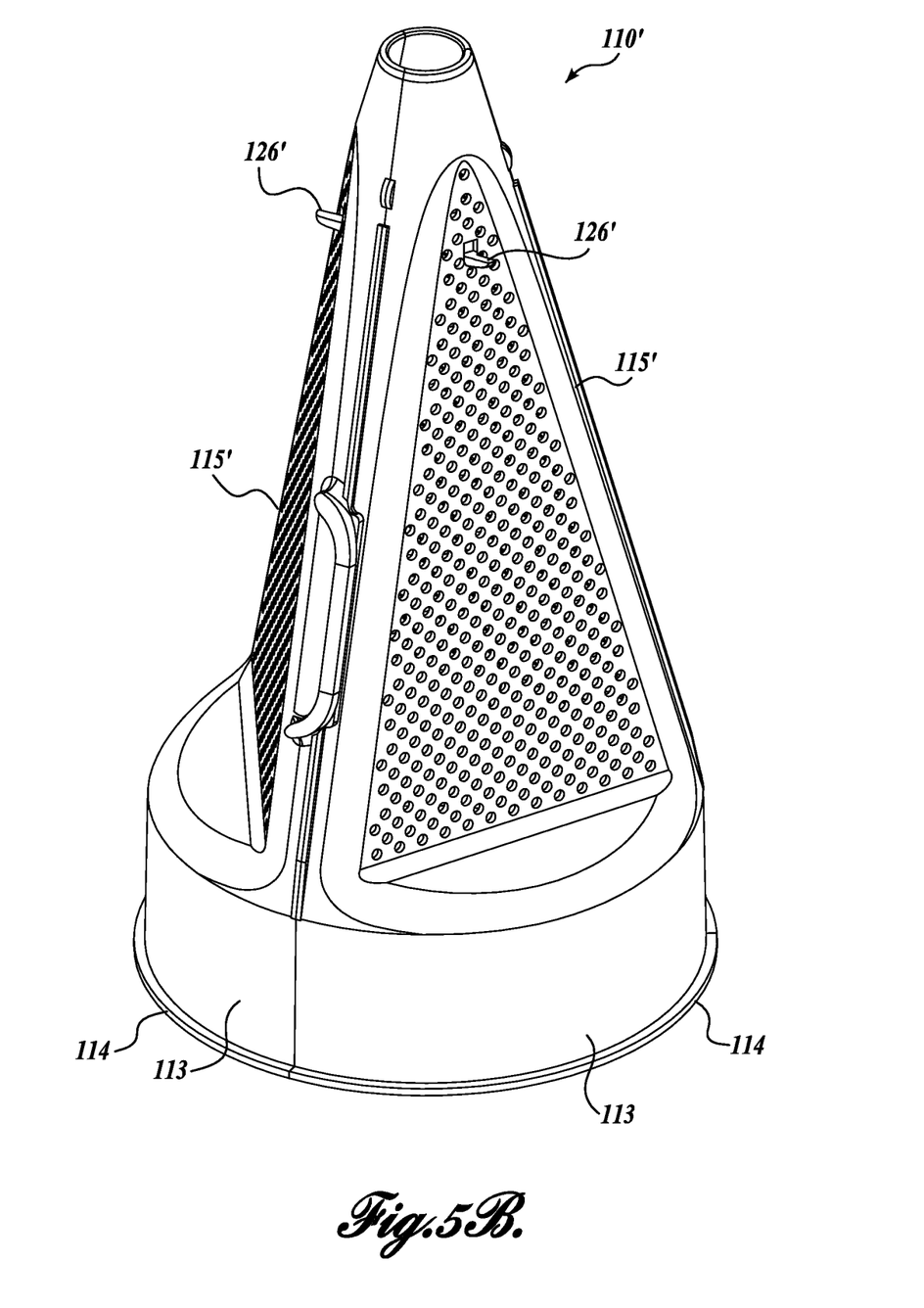
FIG. 5B is a perspective view of an entry cone structure for the exemplary insect trap shown in FIG. 1B, similar to the entry cone structure shown in FIG. 5A, but including outwardly-oriented hooks for supporting attractants.

FIG. 5B shows the entry cone 110' for the insect trap 100'. The entry cone 110', which may be formed as a unitary component and assembled similar to the entry cone 110 of FIG. 5A, includes one or more outwardly extending hooks 126' that extend from one or more of the panel portion 115' of the entry cone 110', and provides a means for securing a package of the attractant 92 to the entry cone 110'. The other aspects of the entry cone 110' are otherwise similar to the entry cone 110 described above.

Refer again to FIG. 1B, wherein the collar 120' in this embodiment is approximately hemispherical in shape and relatively larger than the collar 120 shown in FIG. 1A. The upper surface 122' of the collar 120' is preferably provided with a slippery or non-stick coating, or with surface features that render the surface slippery to the target insects 90, as discussed above. The lower edge 124' is disposed away from the entry cone 110', thereby preventing a trapped insect from crawling back up to the top of the entry cone 110'.

The generally hemispherical construction of the collar 120' provides certain advantages over the frustoconical collar 120 discussed above. In particular, the curvature of the upper surface 122' is close to horizontal near the center aperture wherein the collar 120' abuts the entry cone 110'. The target insect is therefore more likely to perceive the collar 120' as a suitable surface for egress and crawl off of the entry cone 110'. The slope of the upper surface 122' increases from near-horizontal to near-vertical as the insect moves away from the entry cone 110', such that the insect reaches a point of no return even before falling from the collar 120'.

As will be apparent from the partially exploded view shown in FIG. 4, to assemble the trap 100 or 100' the tab 161 of each vane 162 is inserted into a corresponding retaining aperture 147 in the lid 140 support structure 145, and the optional lower attachment tabs 169 are interconnected. The entry cone 110 or 110' is positioned in the lid 140 between the inner wall 143 and outer wall 142. The collar 120 or 120' is placed over the top end of the entry cone 110 or 110' such that the top edge of the collar 120, 120' abuts the entry cone 110, 110'. One or more packages of attractant 92 are inserted into the entrapment chamber 102, for example hung from the hook portions 126 of the collar 120 or the hook 126' of the entry cone 110', and the entrapment chamber 102 is placed over the entry cone 110, 110' and threadably engages the lid 140. The assembled trap 100, 110' may then be placed at a location where the target insects, e.g., stink bugs, are to be trapped. One or more of the apertures 159 in the vanes 162 and/or the nib 108 at the top of the entrapment chamber 102 may be used (e.g., with wire string or the like) to fix the trap 100, 110' at the location, and to prevent the trap 100, 100' from toppling or otherwise being inadvertently repositioned, for example, by the wind. (For clarity, unless otherwise indicated the remainder of the disclosure will be understood to apply to any of the disclosed embodiments, without citing alternate drawing identifiers.)

The attractant, e.g., a pheromone attractant, disposed in the trap is preferably packaged, formulated, or otherwise adapted to release gradually over time. The concentration of attractant will naturally rise within the entrapment chamber and escape through the entryways 170 to generate a plume. The plume will, in general, increase in concentration as it is followed towards the trap 100. In particular, the attractant concentration will generally be greatest in and around the trap 100. Target insects will therefore be attracted first to the general vicinity of the trap 100 by the external plume. The typical, instinctual behavior of the stink bugs, such as the brown marmorated stink bug, is to land near or on a vertical structure and to climb upwardly. In the present trap 100, stink bugs landing near or on the vanes 162, drawn by the attractant plume, will sense an organically configured surface defined by the shape and surface features of the vanes 162, and will be motivated to climb the vanes 162 by the increasing concentration of attractant as the insect moves nearer the entryways 170.

The contoured surfaces 141 of the annular lid 140 provide a more natural appearing environment such that the insects 92 are not deterred from proceeding through the entryways 170, where nearly vertical surfaces defined by the panel portions 115 of the entry cone 110 invite further climbing. Upon reaching the small opening 112 at the top of the entry cone 110 (toward a relatively open space beyond), the insects 92 proceed, but the relatively steep angle and smooth surface of the entry cone 110 and collar 120 cause the insect to slide or fall down towards the base of the cone 110. Moreover, the collar 120 effectively prevents trapped stink bugs from climbing back to the top of the cone 110.

In a current embodiment the entrapment chamber 102 is transparent such that ambient light will illuminate the interior of the trap 100, and the external environment is visible from inside the entrapment chamber 102. Although it is also contemplated by the present invention that the entrapment chamber 102 may be translucent, or even opaque, it is believed that the naturally illuminated interior of the entrapment chamber will be more conducive to target insects 92 entering the trap.

In a method of use, the tabs 161 of the vanes 162 are inserted into corresponding retaining apertures 147 in the support structure 145. Optionally, the lower attachment tabs 169 interconnect distal ends of the vanes 162. The entry cone 110 is placed over the entryway 170 on the opposite side of the lid 140. The collar 120 is then positioned on the entry cone 110. One or more attractant packages 92 may then be placed about the entry cone 110, for example, by hanging them from the collar hooks 126 or from hook structures on the entry cone 110, or simply placing them adjacent the entry cone 110. The entrapment chamber 102 is then positioned over the entry cone 110 to engage the lid 140, for example, with threaded fastening, friction fit, locking tabs, etc. The trap 100 may then be conveniently placed to trap the target insect 90. For example, a string, wire, or other lanyard may engage the nib 108 of the entrapment chamber 102 and may be used to hang the trap 100 from a branch, or other structure. Alternatively, the trap 100 may be positioned on the ground, resting on the vane assembly 160. In either case, a string, tie wrap, wire, or other attachment device may engage one or more apertures 159 on the vane assembly 160 and may be used to attach the base to another structure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A bug trap comprising:
   a lid defining an entry aperture;
   a vane assembly extending downwardly from the lid;
   an entry cone extending upwardly from the lid, the entry cone having a relatively large open proximal end and a relatively small open distal end;
   a collar disposed over a top end of the entry cone, the collar having an upper edge that abuts the entry cone and a lower edge disposed away from the entry cone, wherein an upper surface of the collar is hemispherical such that the upper surface is approximately horizontal at the upper edge and is approximately vertical at the lower edge; and
   an entrapment chamber that engages the lid.

2. The bug trap of claim 1, wherein the vane assembly comprises a plurality of vanes, each vane having a relatively narrow proximal portion that engages the lid, and a relatively wide distal portion.

3. The bug trap of claim 2, wherein each of the plurality of vanes comprises a curved panel.

4. The bug trap of claim 2, wherein the plurality of vanes extend outwardly from a centerline of the vane assembly.

5. The bug trap of claim 2, wherein the plurality of vanes have surface features comprising a plurality of angled ridges.

6. The bug trap of claim 2, wherein each of the plurality of vanes further comprises a plurality of apertures that extend through a thickness of the vane, wherein the plurality of apertures permit air and light to pass through the vane.

7. The bug trap of claim 2, wherein each of the plurality of vanes further comprises means for interconnecting the plurality of vanes.

8. The bug trap of claim 2, wherein each of the plurality of vanes comprises a flanged outer edge.

9. The bug trap of claim 2, wherein the lid further comprises a support structure defining a plurality of retaining apertures, and further wherein each of the plurality of vanes further comprise a tab that is sized and configured to slidably engage one of the plurality of retaining apertures.

10. The bug trap of claim 9, wherein the support structure further defines a plurality of panels that extend upwardly such that each of the plurality of panels defines a bridge from the plurality of vanes to the entry cone.

11. The bug trap of claim 1, wherein the lid further comprises a contoured lower surface.

12. The bug trap of claim 1, wherein the entry cone comprises a cylindrical lower portion and an upper portion comprising a plurality of perforated panels that define a converging region therebetween.

13. The bug trap of claim 1, wherein the collar further comprises a polytetrafluoroethylene powder coating.

14. The bug trap of claim 1, wherein at least one of the collar and the entry cone further comprise means for retaining a package containing an attractant.

15. The bug trap of claim 1, wherein the entrapment chamber is transparent.

* * * * *